United States Patent [19]
Ta-Hsien et al.

[11] Patent Number: 5,312,113
[45] Date of Patent: May 17, 1994

[54] VIDEO PUZZLE CUBE GAME

[76] Inventors: Chen Ta-Hsien, F.4, No. 111-24, Sec.4, San Ho Road, San Chung City; Yang Hsiu-Yu, F.4, No. 39, Alley 95, Chih Yuan 2nd Rd., Taipei, both of Taiwan

[21] Appl. No.: 980,840
[22] Filed: Nov. 24, 1992
[51] Int. Cl.$^5$ .............................................. A63F 9/22
[52] U.S. Cl. ................................................... 273/434
[58] Field of Search ...................................... 273/434

[56] References Cited
U.S. PATENT DOCUMENTS
4,530,499  7/1985  Breslow et al. ............... 283/434

Primary Examiner—William H. Grieb
Attorney, Agent, or Firm—Lowe, Price, LeBlanc & Becker

[57] ABSTRACT

A video puzzle cube game includes a plurality of keys controlled to drive a program to show a hexahedron pattern, a menu and a field on a screen display, said hexahedron pattern having six sides, each side being divided into nine equal divisions, each division being divided into nine six blanks respectively filled with or for filling with either of six different unit squares alternatively given by said program through said field, by means of the control of said keys.

15 Claims, 8 Drawing Sheets

VIDEO PUZZLE CUBE GAME

BACKGROUND OF THE INVENTION

The present invention relates to a game played through the operation of a program in an integrated circuit controlled by control keys to change the game content displayed through a liquid crystal display, so as to exercise one's mind over logic decisions on relative three-dimensional positions and simultaneously amuse oneself.

Various devices and games including the ancient tangram, chesses, checkers and mazes, and the modern picture puzzles and a variety of intricate TV and computer games are known and designed for testing ingenuity or exercising one's mind over problems. A computer game is played through a computer by means of the execution of a computer game software. A good computer game software is determined according to the state of intricacy and the level of intelligence test.

SUMMARY OF THE INVENTION

The present invention is to provide a video puzzle cube game which extends out a cube into planes for playing the game of picture puzzles by means of control keys. It is another object of the present invention to provide a video puzzle cube game which is suitable for people of all ages to play with. It is still another object of the present invention to provide a video puzzle cube game which uses a handy game machine for playing the game, which game machine is inexpensive to manufacture and convenient to carry. It is still another object of the present invention to provide a video puzzle cube game which includes a special scoring method for showing the intelligence test result and for making the game more practical in play.

DETAILED DESCRIPTION OF THE PREFERRED EMBODIMENTS

Figure 2:
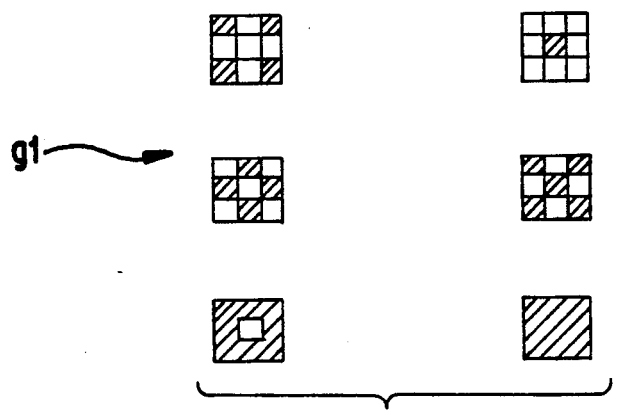
FIG. 2 illustrates unit squares according to the present invention.
Figure 1:
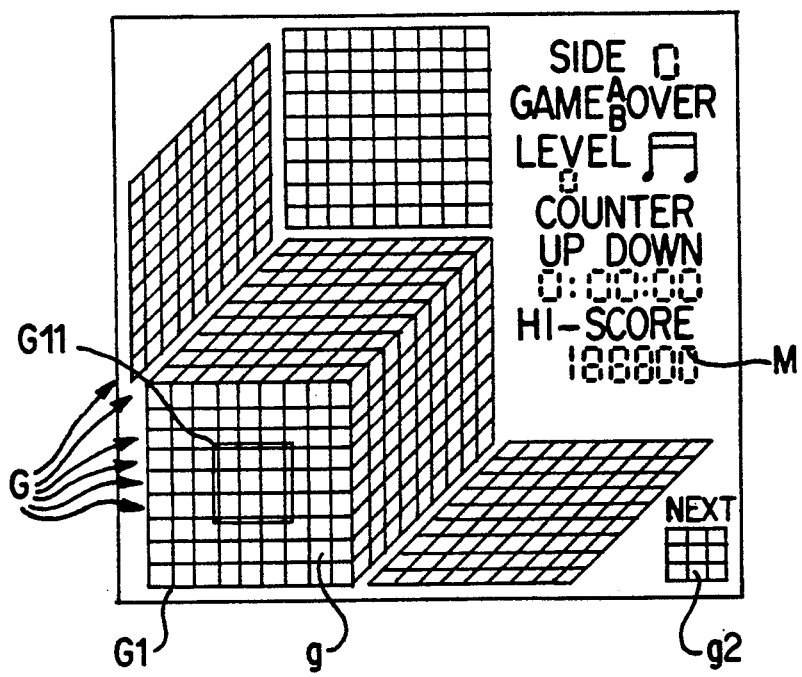
FIG. 1 illustrates the game of the present invention shown on a display.

Referring to FIGS. 1 and 2, when the game is started, the display shows a cube in a hexahedron pattern (G) having three equal square sides shown through a projective drawing and the other three equal square sides spread out. Each side of the cube is divided into nine equal divisions (g). Each division (g) is further divided into six blanks respectively filled with unit squares (g1). There are total six different patterns of unit squares (g1) (see FIG. 2). The front side of the hexahedron pattern (G) is assigned the operative side (G1) in a side change operation. A cursor (G11) is shown on the operative side (G1) for directional indication. A field (g2) is shown on the display at the right bottom corner. A menu (M) is shown on the display at an area above the field (g2). The game provides a function for turning either nonoperative side into the operative side (G1). By operating CURSOR MOVE/CUBE ROTATE key (6) (7) (8) (9) keys to move the cursor (G1), the positions of the six sides of the hexahedron pattern (G) are relatively changed through rotations. The game also provides a SINGLE LINE ROTATE function for turning lines (columns). By operating SINGLE LINE ROTATE keys (10) (11) (12) (13) to move the cursor (G1) within the operative side (G1), the positions of the three lines or three columns on the operative side (G1) are relatively displaced. The score made in the game is directly proportional to the number of identical unit squares (g1) on the same side. On the contrary, the score is relatively reduced if the number of identical unit squares (g1) on the same side is lessened. The total score on the six sides of the hexahedron pattern G within a unit time is shown on the MENU (M). Furthermore, when scoring up or scoring down, a specific sound is respectively made. The operation of time counting may be made in two reverse ways:

1. Count up: To count the length of time spent in making up the six sides of the hexahedron pattern (G) and show through the MENU (M) the total units of time being spent; and 2. Count down: To count off, in reverse order, of predetermined units of time and show through the MENU (M) the number of sides being made up upon zero reading.

The game of the present invention provides two options for choice, namely, GAME A and GAME B. When GAME A was selected, the game machine provides a random-number arrangement for permitting the player to make up the six sides of the hexahedron pattern (G) by operating respective keys. When GAME B was selected, the game machines provide unit squares (g1) in proper order through the field (g2) for the player to fill up the blank on the six sides of the hexahedron pattern (G) by operating respective keys. Different levels are provided for different challenges and alternatively shown through the menu (M). When GAME B was started, a low level and a high level may be alternatively selected according to different challenge requirements. When the high level was selected, more blanks on each side have been filled with different unit squares before playing; and the player shall have to frequently turn the sides (lines/columns) in moving pre-set unit squares to other positions and then to fill the blanks with provided unit squares on the field. It is not possible to make up the six sides of the hexahedron pattern without turning the sides (lines/columns).

The game also provides a BOON function to destroy part of the hexahedron pattern under the mode of GAME B for filling the blanks in a new way as the player thought that it would be not possible to make up the sides of the hexahedron pattern.

Figure 4:
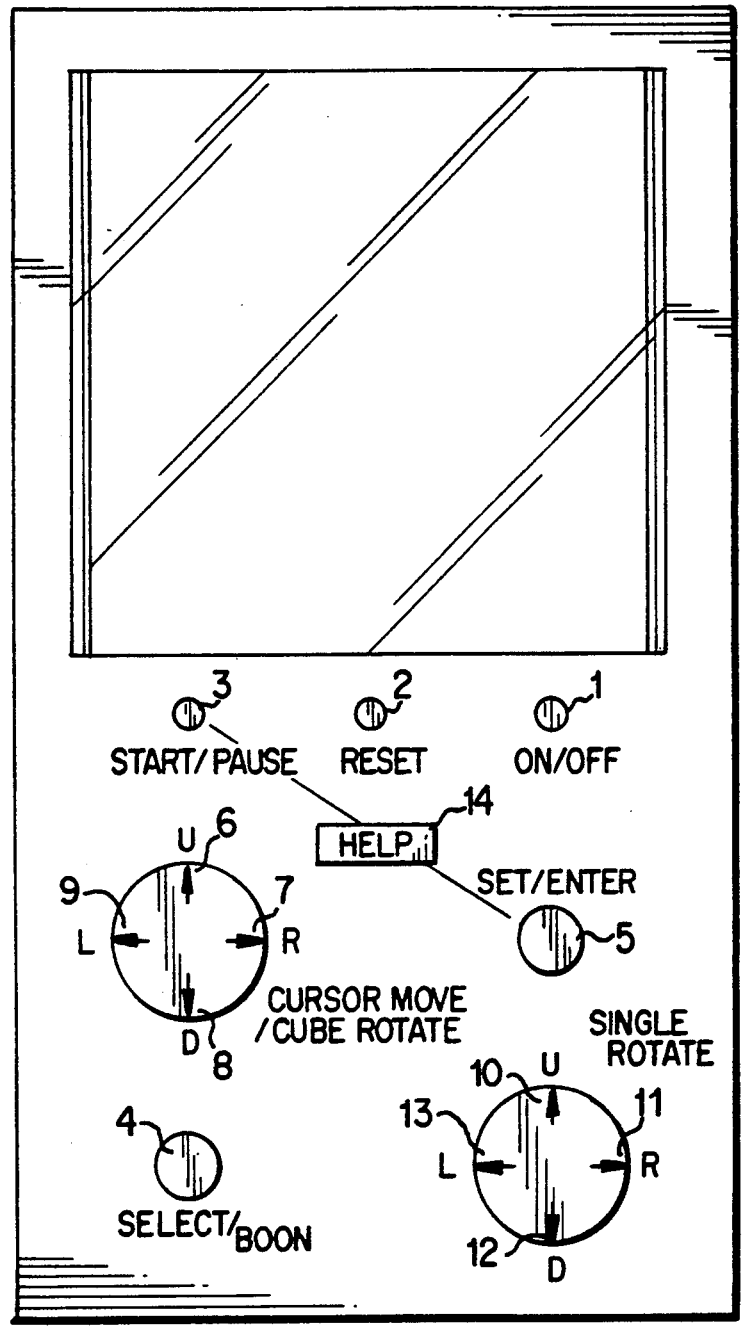
FIG. 4 is a front view of a game machine for playing the game.

The game also provides a pause function to stop the game for a time by pressing a START/PAUSE key (3) (see FIG. 4). Under the mode of pause, the MENU (M) shows the length of time spent and the score obtained properly for each side being made up for player's reference or a comparison (in a contest). The game starts again if the START/PAUSE key was pressed secondarily.

The game also provides an option function to select GAME A or GAME B, counting with sound or in silence; high level or low level under the mode of GAME B.

The game also provides a setting function for setting selections made through the aforesaid option function.

The game also provides a tutorial (HELP) function to teach the player to make up the hexahedron pattern as the player couldn't make up the six sides timely while playing GAME A.

The game also provides a reset function to return the game to the initial state.

The game also provides a start function to start the predetermined game.

The game also provides an ON/OFF power switching key. Once the power switching key was switched on, the game machine automatically starts GAME A, counts up units of time, shows the relative score on the MENU, and simultaneously makes a sound each time the game is scoring up.

The game also provides a sound/silence optional function. When the mode of sound was selected, a specific sound will be made each time the game is scoring down (a key is pressed) and at the same time the symbol of $\eta$ will be shown on the MENU. When the mode of silence was selected, no sound will be made.

The game also provides an automatic shut-off function to make a pleasing piece of music for 20 seconds and show "game over" on the MENU and then automatically cut off power supply if the player gives no any instruction within 180 seconds.

Figure 3:
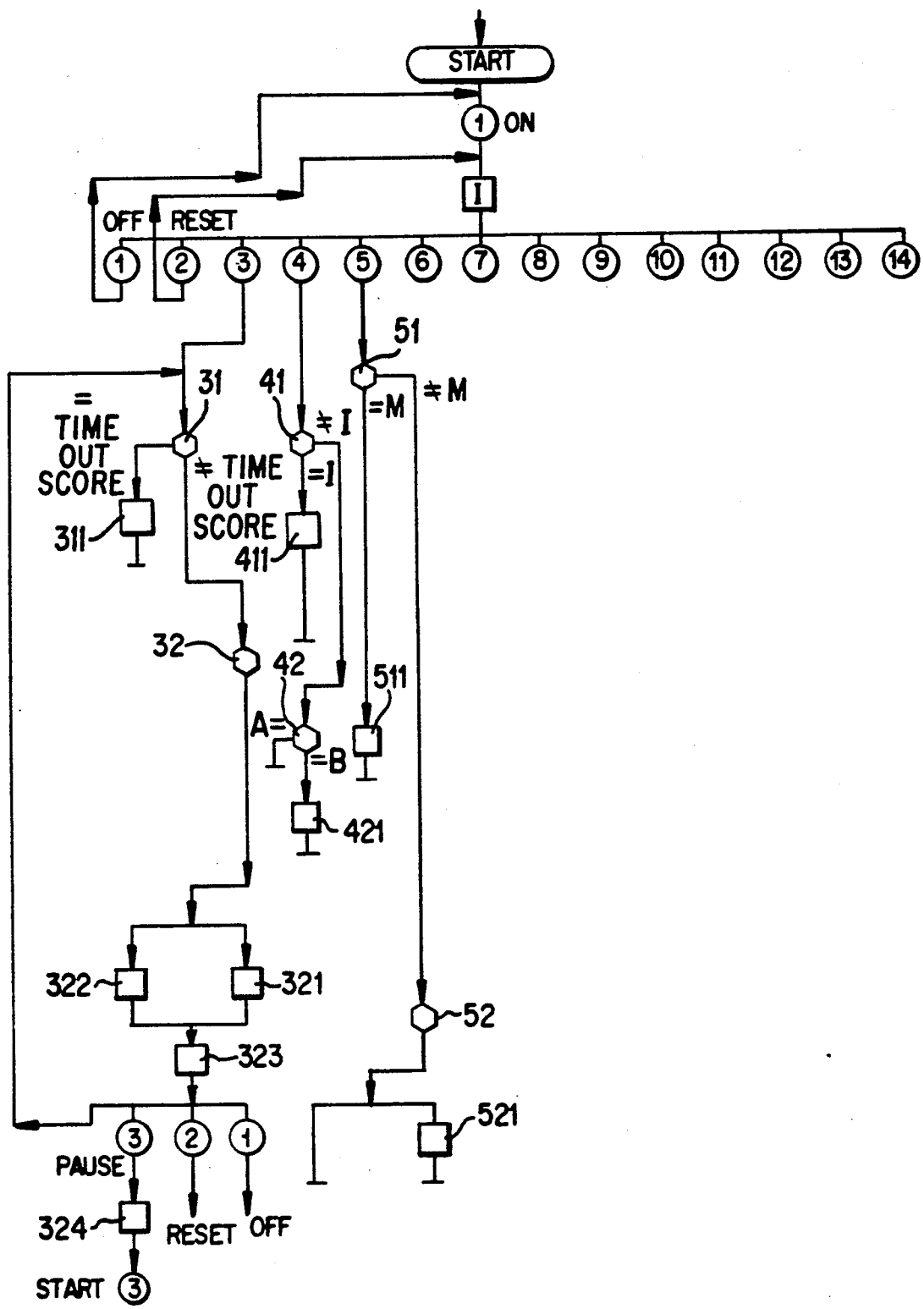
FIG. 3 is an operational flow chart according to the present invention.

Referring to FIGS. 3 and 4, therein illustrated is the operational flow chart and the game machine for playing the game according to the present invention. The game machine comprises an ON/OFF power switching key (1), a RESET key (2), a START/PAUSE key (3), a SELECT/BOON key (4), a SET/ENTER key (5), CURSOR MOVE/CUBE ROTATE keys (6) (7) (8) (9), SINGLE ROTATE keys (10) (11) (12) (13), and a HELP key (14).

Pressing the ON/OFF power switching key (1) causes the game to enter INITIAL STATE (I) in displaying the content of the game by simulating GAME A. During the simulating of GAME A, the game machine counts up, shows the current high score, and makes sounds.

Pressing the ON/OFF power switching key (1) again causes the game machine to cut off power supply and stop the game.

Pressing the RESET key (2) causes the game machine to clear the game and return it to the initial state and then execute the program.

Pressing the START/PAUSE key (3) causes the program to make a decision (31) so as to process an action (311) in making a sound for 20 seconds after the display of GAME OVER on the MENU (M) and then automatically shutting off power supply if the decision (31)=TIME OUT or HI-SCORE (the highest score), or to make another decision (32) if the decision (31)≠TIME OUT or HI-SCORE. The decision (32) is to determine if there is any game content set by the player. If there is a game content set by the player, the game content is then executed. If there is no any game content set by the player, the program is continuously executed to play the game content originally set in the program by means of the operation of the CURSOR MOVE/CUBE ROTATE keys (6) (7) (8) (9) and the SINGLE ROTATE keys (10) (11) (12) (13). During the procedure of the game, the score may be continuously increased or reduced. When scoring up, an action (321) will be executed to make a specific sound and show the new score on the MENU (M). When scoring down, another action (322) will be executed to make another specific sound and show the new score on the MENU (M). After the action (322), the game is continued (323), and the relative indications are shown on the display. Under this state, the game machine will be turned off if the ON/OFF power switching key (1) is pressed, or returned to the initial state if the RESET key (2) is pressed, or the game will be stopped for a time to execute an action (324) if the START/PAUSE key (3) is pressed. The action (324) is to show COUNTER UP or COUNTER DOWN and the relative figure (the figure of time being counted up or down), HI-SCORE and the relative figure (the score been achieved) and SIDE and the relative figure (the number of sides been made up) on the MENU (M) for reference. If the START/PAUSE key (3) is pressed secondarily, the program executes the start function to continue the game.

Pressing the SELECT/BOON key (4) causes the program to make a decision (41). If the decision (41)=the INITIAL STATE (I), an action (411) will be executed to show related MENU1-7 (M) for selection. If the decision (41)≠the INITIAL STATE (I), it means that the game is still under going, and the program will make another decision (42). If the result of the decision (42) indicates that the game is at the mode of GAME A, the program does not make any action. If it is identified that the game is at the mode of GAME B, the program immediately makes an action (421). The action (421) is to select the positions of the blanks for filling with unit squares at the beginning of GAME B, or to destroy those unit squares (g1) which are located on the operative side (G1) of the hexahedron pattern (G) around the cursor (G11) so as to make them into blanks for further filling with unit squares, and at the same time to make a sound when the confined unit squares (g1) are destroyed.

Pressing the SET/ENTER key (5) causes the program to make a decision (51). If the decision (51)=the MENU, an action (511) will be executed to change the setting of the setting of the default value of the MENU. If the decision (51)≠MENU≠TIME OUT≠HI-SCORE, it means that the game is still under going, and the program will make another decision (52). If the decision (52)=GAME A, the game enters the mode of GAME A without making any action. If the decision (52)= GAME B, the program makes an action (521) for setting the positions of the blanks on the six sides of the hexahedron pattern (G) and dealing unit squares (g1) through the field (g2) for filling the blanks.

The CURSOR MOVE/CUBE ROTATE keys (6) (7) (8) (9) are for moving the cursor (G11) and rotating the hexahedron pattern (G).

The SINGLE ROTATE keys (10) (11) (12) (13) are for rotating the lines or columns of the divisions (g) on the operative side (G1) of the hexahedron pattern (G).

The HELP key (14) is to help the player learning the functions of the game machine in making up the hexahedron pattern (G) by means of the operation of the START/PAUSE key (3) and the SET/ENTER key (4).

According to the aforesaid statement, the game is operated according to the following procedures:

1. Press the ON/OFF power switching key to enter the INITIAL STATE (I);

2. Press the SELECT/BOON key (4) and the SET-/ENTER key (5) to set up game content, or let the game machine enter GAME A automatically;

3. Press START/PAUSE key (3) to start the game;

4. Use the CURSOR MOVE/CUBE ROTATE keys (6) (7) (8) (9) and the SINGLE ROTATE keys (10) (11) (12) (13) to make up the hexahedron pattern (G), and the related hi-score and counting will be shown in the MENU (M) on the display;

5. The game can be stopped for a time by pressing the START/PAUSE key (3) while playing, and the related high-score and counting will be shown in the MENU (M) on the display;

6. In case no any achievement is made after a length of time has been spent in playing the game, the player may press the START/PAUSE key (3) and then press the SET/ENTER key (5) to execute the function of the HELP key (14) in driving the program to return to the pattern at the start and tutor the game;

7. If GAME B is under going and it seems not possible to make up a pattern, the player may press the SELECT/BOON key (4) to destroy part of the content of the pattern on the operative side (G1) and turn it into blanks for filling with unit squares again;

8. The game may be cleared and returned to the INITIAL STATE (I) by pressing the RESET key (2) for setting again;

9. The game machine may be turned off by pressing the ON/OFF power switching key (1) to terminate the game, or the game will be terminated automatically if no instruction is given within the predetermined length of time.

Figure 5:
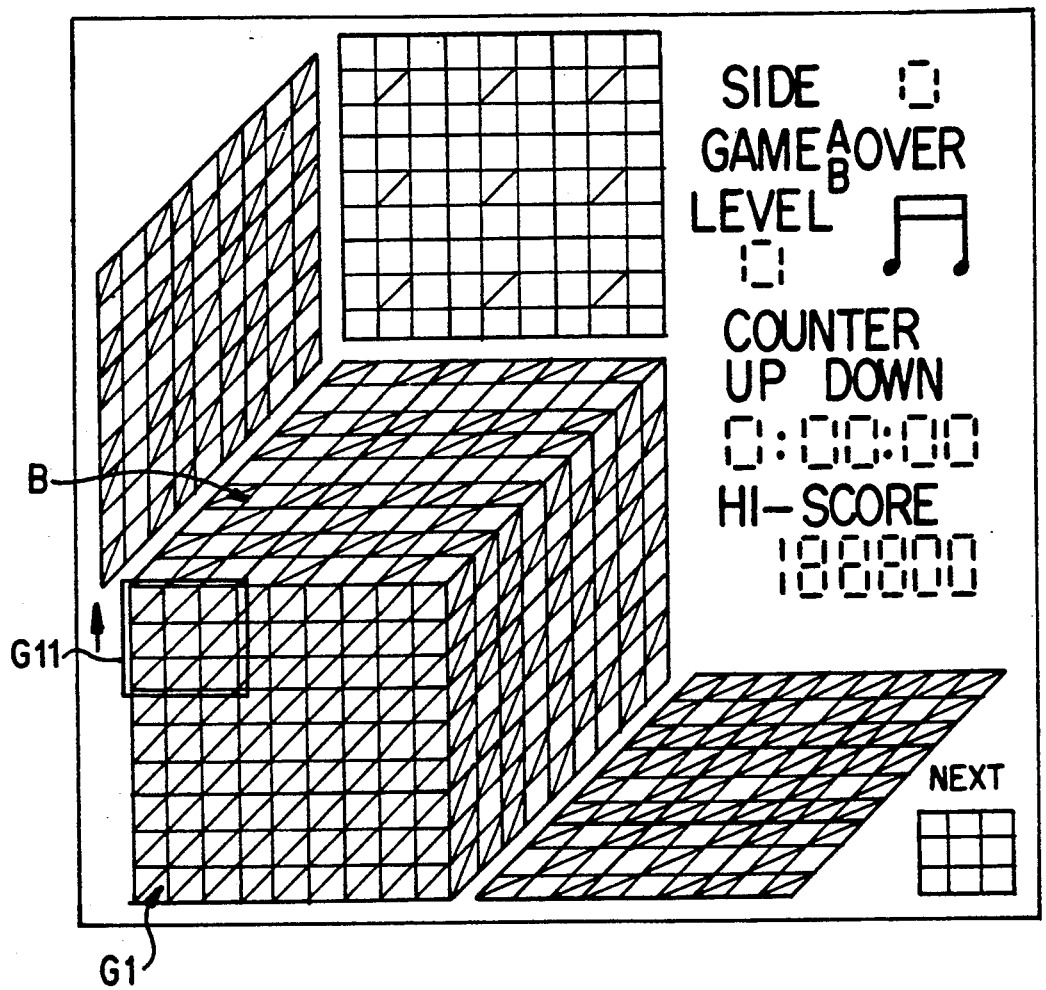
FIGS. 5 and 6 illustrate a procedure to rotate the hexahedron pattern.
Figure 6:
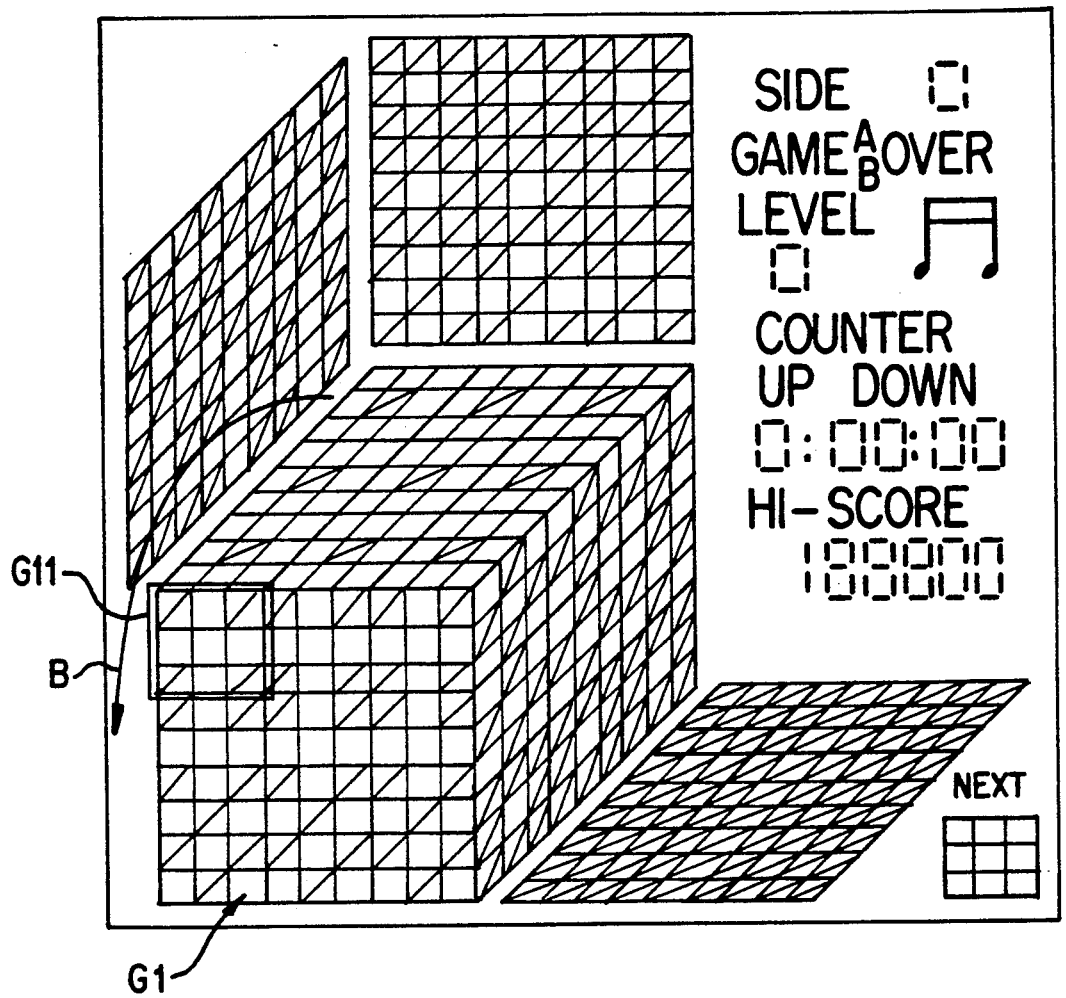

The operation to turn either side of the hexahedron pattern (G) into the operative side (G1), namely, the operation of the CURSOR MOVE/CUBE ROTATE keys (6) (7) (8) (9) is shown by way of an example. For example, FIG. 5 illustrates a procedure to turn the top side (B) to the operative side (G1) by continuously pressing the upward key (6) to move the cursor (G11) to the position of the top division (g) on the same column and then pressing the key (6) again, and then the relative positions of six sides of the hexahedron pattern (G) and the cursor (G11) are set as shown in FIG. 6.

Figure 7:
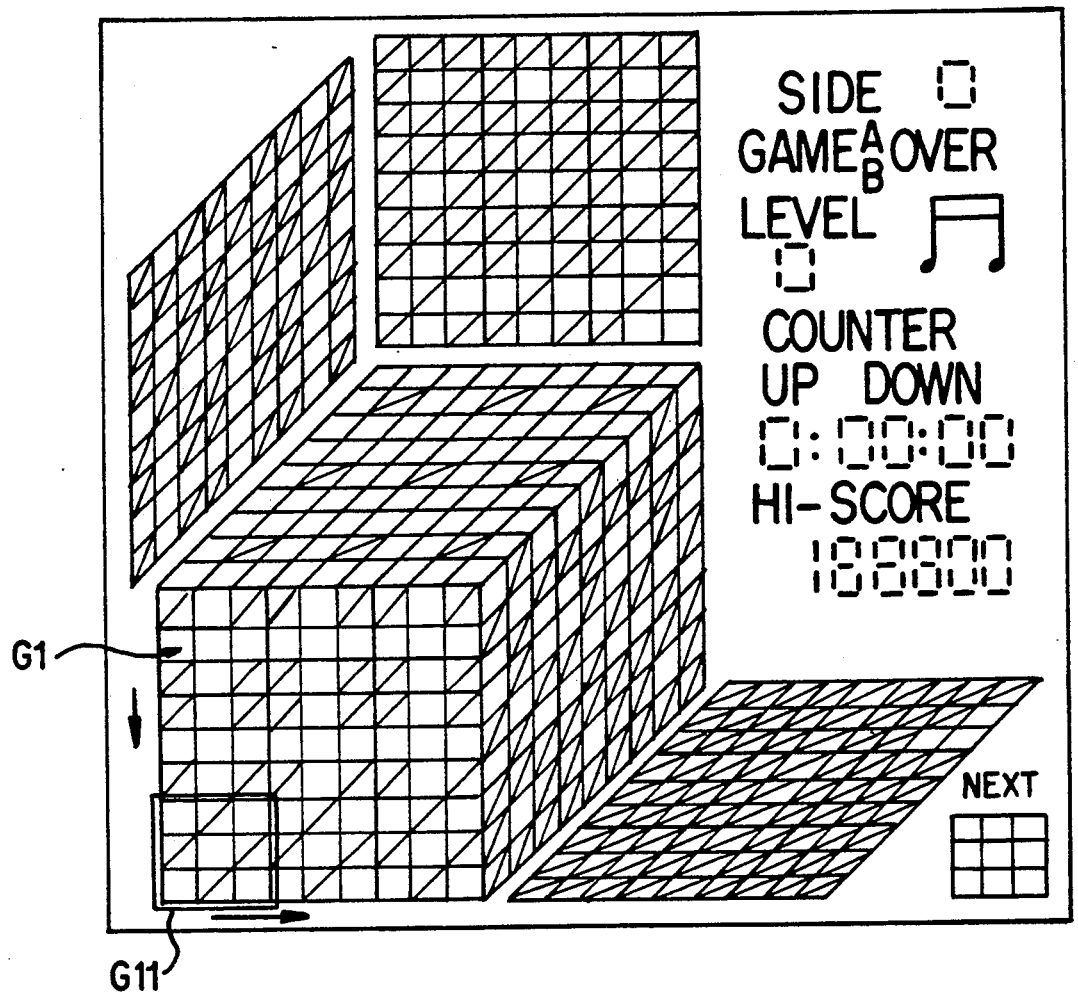
FIG. 7 illustrates a procedure to rotate the operative side of the hexahedron pattern.
Figure 8:
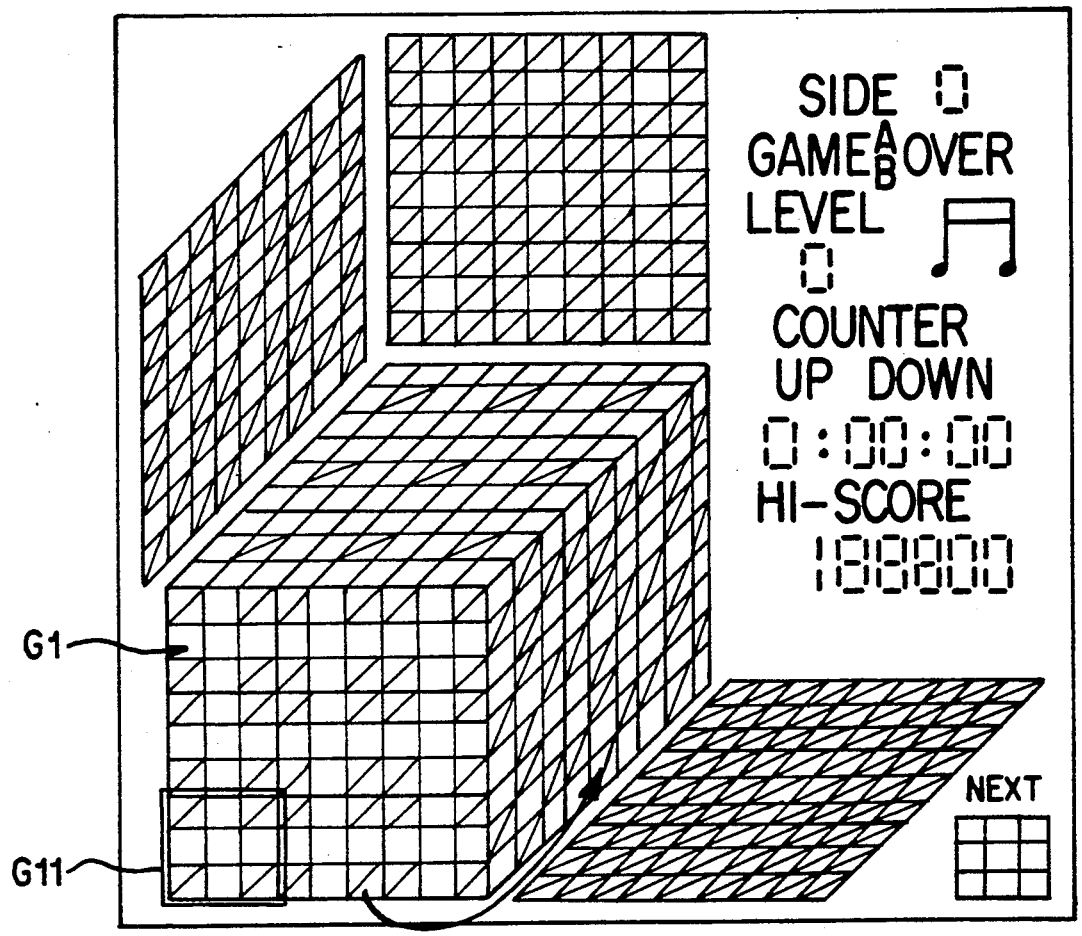
FIG. 8 illustrates the pattern on one side of the hexahedron pattern has been completed.

The operation to turn the lines (columns) on the operative side (G1), namely, the operation of the SINGLE ROTATE keys (10) (11) (12) (13) is described by way of an example. For example, turning the first line (bottom line) of the operative side (G1) rightwards (through 90° angle) is operated by continuously pressing the downward key (12) to move the cursor (G11) to the first line (see FIG. 7) and then pressing the rightward key (11) to rotate the lines (columns) through 90° angle. Therefore, the hexahedron pattern (G11) is turned into another arrangement as shown in FIG. 8.

Figure 9:
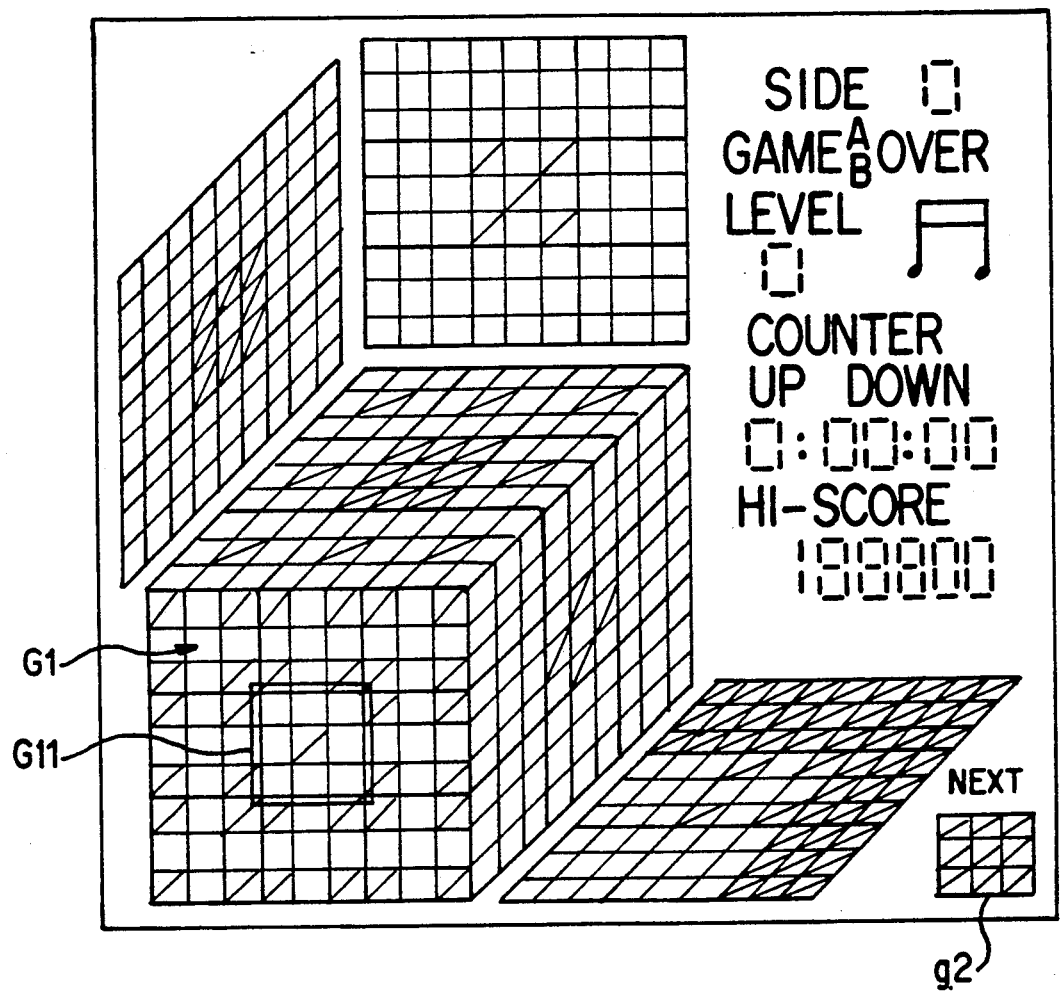
FIG. 9 illustrates the operation in filling the blanks under the mode of GAME B.

At the beginning of the mode of GAME B, different unit squares (g1) will be presented in the field (g2) on the display (L) one after another for using and filling the selected positions, and then the game can be started for playing (see FIG. 9).

What is claimed is:

1. A video puzzle cube game comprising a game machine having a display screen and a plurality of control keys, controlled program means controlled by said keys for showing a hexahedron pattern, a menu and a field on said display screen, said hexahedron pattern having six sides, each side being divided into nine equal divisions, each division being divided into six blanks respectively filled with or for filling with either of six different unit squares, each of a different predetermined pattern, alternatively given by said program through said field, by means of the control of said keys, said pattern having an operative side wherein said unit squares are used to fill blanks and said program further being controlled by said keys to change the operative side of said pattern available for filling.

2. The video puzzle cube game according to claim 1 wherein said keys include an ON/OFF power switching key, said ON/OFF power switching key being alternatively pressed to turn the game to an initial state and cause said program to score the play and display the content of the game and the scoring of the play and make sounds while scoring, or to turn off said game machine in stopping the game.

3. The video puzzle cube game according to claim 2 wherein said keys include a RESET key, said RESET key being pressed to clear the game and return it to the initial state.

4. The video puzzle cube game according to claim 3 wherein said keys include a START/PAUSE key, said START/PAUSE key being pressed to drive said program to make a first decision so as to process an action in displaying GAME OVER in said menu on said display and making a sound for 20 seconds and then automatically shutting off power supply if the decision =TIME OUT or HI-SCORE and there is no further instruction given.

5. The video puzzle cube game according to claim 4 wherein said program is driven to make a second decision in determining if there is any game content present by the player when said first decision ≠TIME OUT and ≠HI-SCORE, and to execute any game content present by the player or to continue the game according to the game content defined by said program.

6. The video puzzle cube game according to claim 5 wherein said program comprises an action to make a first specific sound when scoring up or a second specific sound when scoring down, and an action to count time and show predetermined indexes on said menu during the playing of the game.

7. The video puzzle cube game according to claim 6 wherein the game is terminated as said ON/OFF power switching key was pressed during the playing of the game; the game is returned to the initial state as said RESET key was pressed during the playing of the game; the game is stopped for a time and said menu shows the figure of score being achieved, the figure of time being counted and the figure of sides being made up, as said START/PAUSE key was pressed during the playing of the game.

8. The video puzzle cube game according to claim 7 wherein the game is continued as said START/PAUSE key was pressed after the game was stopped for a time.

9. The video puzzle cube game according to claim 8 wherein said keys include a SELECT/BOON key, said SELECT/BOON key being pressed to drive said program to make a decision so as to show related menus of the game through said screen display for selection as the game was at the initial state, or to drive said program to make another decision if the game was not at the initial state.

10. The video puzzle cube game according to claim 9 wherein said program does not make any action if the game was at the mode of GAME A as said SELECT BOON key was pressed; said program is instructed to make a sound and execute an action if the game was at the mode of GAME B as said SELECT/BOON key was pressed, the action being to let the player select the positions of banks for filling with unit squares if said SELECT/BOON key was pressed at the initial state, or to reset the game if said SELECT/BOOM key was pressed during the playing of the game.

11. The video puzzle cube game according to claim 1 wherein said keys include a SET/ENTER key, said SET/ENTER key being pressed to drive said program to make a first decision, so as to make an action in letting the player change the default value of the menu if the game =MENU (at the state of the menu) or to make a second decision if the game ≠MENU ≠TIME OUT ≠HI-SCORE.

12. The video puzzle cube game according to claim 11 wherein said program does not make an action if the game was at the mode of GAME A as said SET/ENTER key was pressed; said program is instructed to make an action for letting the player to set the positions of the blanks for filling with unit squares if the game was at the mode of GAME B as said SET/ENTER key was pressed.

13. The video puzzle cube game according to claim 1 wherein said keys include CURSOR MOVE/CUBE ROTATE keys for rotating said hexahedron pattern in four directions.

14. The video puzzle cube game according to claim 1 wherein said keys include SINGLE ROTATE keys for rotating said operative side of said hexahedron pattern in four directions.

15. The video puzzle cube game according to claim 1 wherein said keys include a HELP key, said HELP key being pressed to instruct said program to perform a tutorial function as said START/PAUSE key and said SET/ENTER key were maintained pressed.

* * * * *